United States Patent
Kelly et al.

(10) Patent No.: US 7,998,632 B2
(45) Date of Patent: Aug. 16, 2011

(54) ANODE TAIL GAS RECYCLE COOLER AND RE-HEATER FOR A SOLID OXIDE FUEL CELL STACK ASSEMBLY

(75) Inventors: Sean M. Kelly, Pittsford, NY (US); Gail E. Geiger, Caledonia, NY (US); John A. MacBain, Carmel, IN (US); Steven R. Shaffer, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 1257 days.

(21) Appl. No.: 11/133,512

(22) Filed: May 20, 2005

(65) Prior Publication Data
US 2006/0263657 A1 Nov. 23, 2006

(51) Int. Cl.
*H01M 8/04* (2006.01)
(52) U.S. Cl. ........ 429/442; 429/408; 429/416; 429/423; 429/428; 429/433; 429/434; 429/435; 429/440
(58) Field of Classification Search ........................ None
See application file for complete search history.

(56) References Cited

U.S. PATENT DOCUMENTS

| | | | | |
|---|---|---|---|---|
| 4,128,700 | A * | 12/1978 | Sederquist | 429/415 |
| 7,056,611 | B2 * | 6/2006 | Fabis et al. | 429/24 |
| 2004/0013913 | A1 * | 1/2004 | Fabis et al. | 429/13 |
| 2005/0074642 | A1 | 4/2005 | Foger | |
| 2006/0251939 | A1 * | 11/2006 | Bandhauer et al. | 429/26 |

FOREIGN PATENT DOCUMENTS

DE 1 557 896 7/2005

OTHER PUBLICATIONS

EP Search Report dated Sep. 21, 2006.

* cited by examiner

*Primary Examiner* — Cynthia Lee
(74) *Attorney, Agent, or Firm* — Thomas N. Twomey

(57) ABSTRACT

An SOFC fuel cell stack system in accordance with the invention including a recycle flow leg for recycling a portion of the anode tail gas into the inlet of an associated hydrocarbon reformer supplying reformate to the stack. The recycle leg includes a controllable pump for varying the flow rate of tail gas. Preferably, a heat exchanger is provided in the leg ahead of the pump for cooling the tail gas via heat exchange with incoming cathode air. A low-wattage electrical reheater is also preferably included between the heat exchanger and the pump to maintain the temperature of tail gas entering the pump, during conditions of low tail gas flow, at a drybulb temperature above the dewpoint of the tail gas.

3 Claims, 4 Drawing Sheets

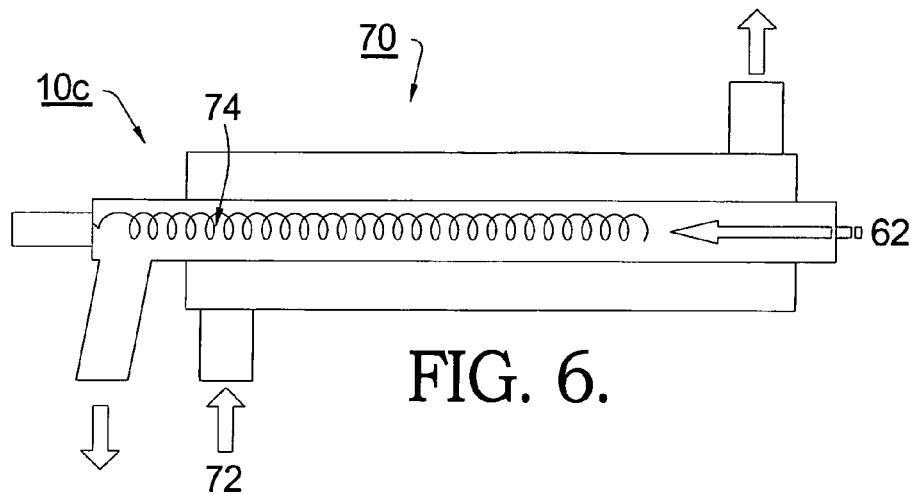
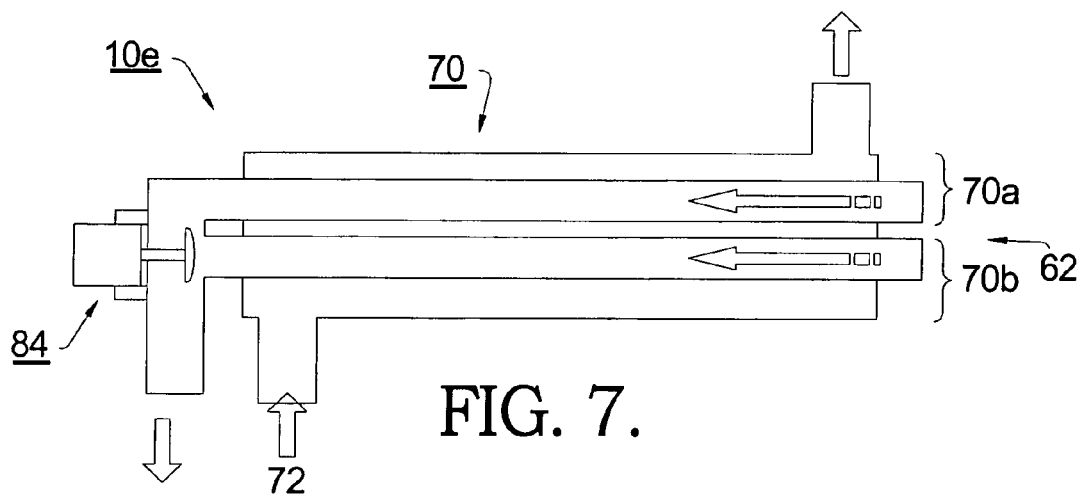

US 7,998,632 B2

ANODE TAIL GAS RECYCLE COOLER AND RE-HEATER FOR A SOLID OXIDE FUEL CELL STACK ASSEMBLY

This invention was made with United States Government support under Government Contract/Purchase Order No. DE-FC2602NT41246. The Government has certain rights in this invention.

TECHNICAL FIELD

The present invention relates to fuel cells; more particularly, to means for recycling a portion of the anode tail gas of a solid oxide fuel cell (SOFC) stack into a hydrocarbon reformer; and most particularly, to a means for adjusting the temperature of recycled anode tail gas.

BACKGROUND OF THE INVENTION

Fuel cells for combining hydrogen and oxygen to produce electricity are well known. A known class of fuel cells includes a solid-oxide electrolyte layer through which oxygen anions migrate to combine with hydrogen atoms to produce electricity and water; such fuel cells are referred to in the art as "solid-oxide" fuel cells (SOFCs).

In some applications, for example, as an auxiliary power unit (APU) for an automotive vehicle, an SOFC is preferably fueled by "reformate" gas, which is the effluent from a catalytic hydrocarbon oxidizing reformer. Reformate typically includes amounts of carbon monoxide (CO) as fuel in addition to molecular hydrogen. The reforming operation and the fuel cell operation may be considered as first and second oxidative steps, respectively, of the liquid hydrocarbon, resulting ultimately in water and carbon dioxide. Generally, both reactions are exothermic, and both are preferably carried out at relatively high temperatures, for example, in the range of 700° C. to 1000° C. In cases where anode gas is recycled to the reformer, the reformer reaction may be endothermic in nature. A complete fuel cell stack assembly includes a plurality of components known in the art as interconnects, which electrically connect the individual fuel cells in the stack, as well as air supply and cooling means.

It is known in the art to recycle a portion of the tail gas from the stack anodes into the inlet to the reformer, which improves stack power density and system efficiency and reduces carbon precipitation and deposition in the system. Such recycling is known to be carried out by aspirating tail gas via a high temperature ejector or venturi. A shortcoming of this approach is that it requires a high-pressure flow source in the system, which may not always be available, and further, control may become unstable under low-flow conditions.

What is needed in the art is a means for reliably providing a controlled flow of SOFC stack anode tail gas into a reformer supplying reformate to the SOFC.

It is a principal object of the present invention to increase reliability of recycling of anode tail gas in an SOFC system.

SUMMARY OF THE INVENTION

Briefly described, an SOFC fuel cell stack system in accordance with the invention includes a recycle flow leg for recycling a portion of the anode tail gas into the inlet of an associated hydrocarbon reformer supplying reformate to the stack. The recycle leg includes a controllable pump for varying the flow rate of tail gas. Preferably, a heat exchanger is provided in the leg ahead of the pump for cooling the tail gas via heat exchange with incoming cathode air. A low-capacity electrical reheater may be included in the heat exchanger or between the heat exchanger and the pump to maintain the temperature of tail gas entering the pump during conditions of low tail gas flow at a drybulb temperature above the dewpoint of the tail gas.

BRIEF DESCRIPTION OF THE DRAWINGS

The present invention will now be described, by way of example, with reference to the accompanying drawings, in which:

FIG. 6 is a schematic cross-sectional view of an integrated supplementary heater and heat exchanger in accordance with the third embodiment shown in FIG. 3; and FIG. 7 is a schematic cross-sectional view of a split-flow heat exchanger in accordance with the fifth embodiment shown in FIG. 5.

DESCRIPTION OF THE PREFERRED EMBODIMENTS

Figure 1:
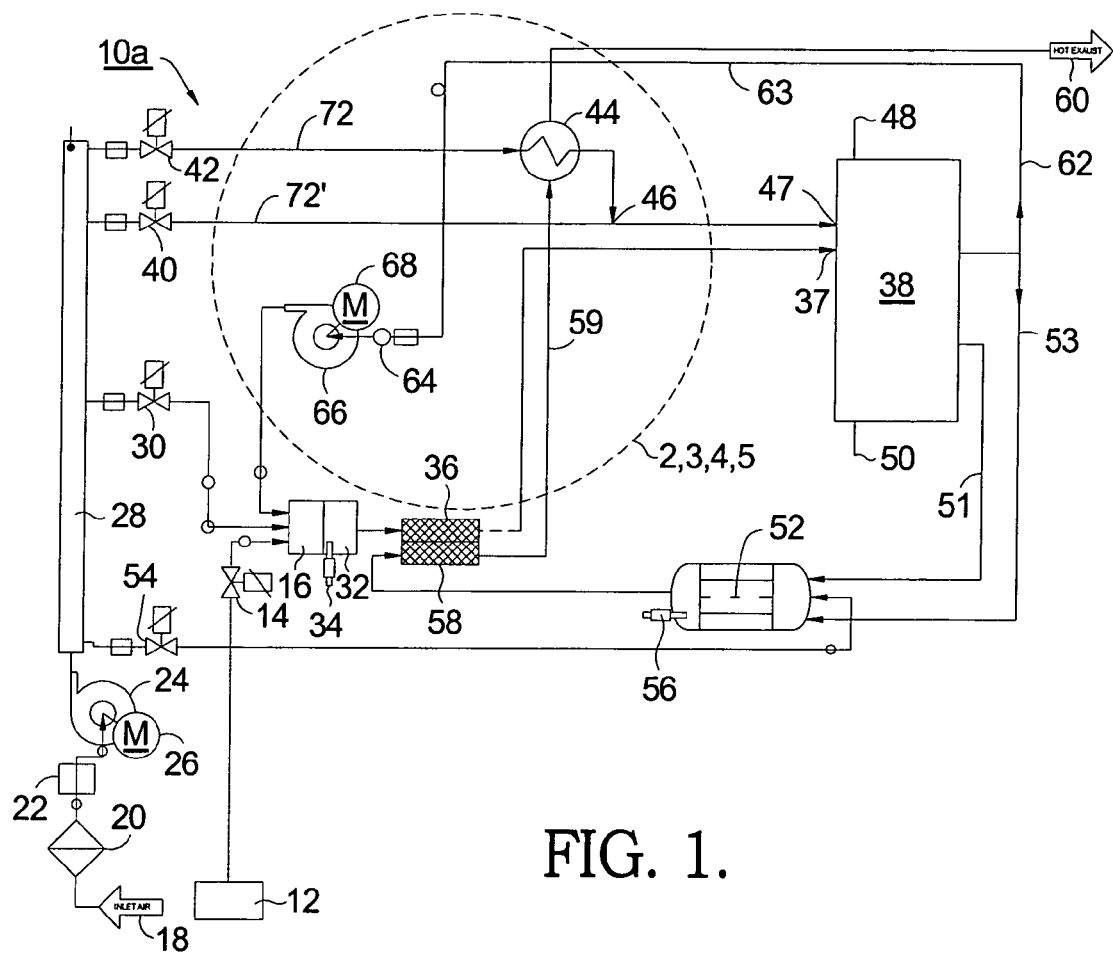
FIG. 1 is a schematic drawing of a first embodiment of an SOFC stack system in accordance with the invention.

Referring to FIG. 1, in a first embodiment 10a of a solid oxide fuel cell stack assembly in accordance with the invention, hydrocarbon fuel is supplied from a fuel tank 12 via a control valve 14 to a vaporizing chamber 16. Air 18 is supplied through a filter 20 and a cooling shroud 22 to a main air blower 24 powered by a motor 26. Blower 24 supplies pressurized air to plenum 28. A first air control valve 30 meters air from plenum 28 into vaporizing chamber 16 where the air and fuel are mixed into a vapor mixture which passes into a start-up combustion chamber 32. Chambers 16,32 are structurally part of a catalytic hydrocarbon reformer 36. During cold start-up of the SOFC system, the vapor mixture is ignited by a spark, or hot-tip igniter 34 to provide a flow of hot gas through the reformer and the SOFC stack. During normal operation, the vapor mixture is not ignited but rather is passed into reformer 36 wherein the mixture is converted into reformate fuel containing hydrogen and carbon monoxide gases. Reformate is passed across the anode side 37 of SOFC stack 38. Cathode air is supplied from plenum 28 via a second air control valve 40 and a third air control valve 42. Air 72 flowing through third control valve 42 is passed through a cathode air heat exchanger 44 and is tempered as described below. The two air streams (72,72') are joined 46 and passed to the cathode side 47 of SOFC stack 38. Within stack 38, oxygen anions from the air passes across an electrolyte layer and is combined with hydrogen and with carbon monoxide in an electrochemical reaction producing an electric potential across a stack anode lead 48 and a stack cathode lead 50. Heated and depleted cathode air 51 is exhausted from stack 38 and passed to a combustor 52. A first portion 53 of anode tail gas exhausted from stack 38 is also passed to combustor 52, and the air/fuel mixture may be augmented by the addition of air from plenum 28 via a fourth control valve 54. The tail gas is ignited by a spark igniter 56 in combustor 52, and the anode and cathode tail gases are combusted to create a hot exhaust gas stream. This hot exhaust gas may be passed through a heat exchanger side 58 of reformer 36 to supply heat and control the temperature of the reformer reaction. In some applications where the reformer reaction is exothermic, instead of being routed to the reformer heat exchanger, the hot exhaust stream may be routed directly to the exhaust side of a cathode air heat exchanger 44. The hot exhaust gas is passed through heat exchanger 44 to raise the temperature of incoming air to the stack. Then, the hot exhaust gas is exhausted 60 to atmosphere.

The operating scheme just described for an SOFC stack system is well known in the prior art.

Referring still to FIG. 1, in accordance with the invention, a second portion 62 of anode tail gas is provided via a recycle flow leg 63 to an inlet to vaporizing chamber 16 via a check valve 64 and a recycle pump 66 comprising an impeller, shaft, shaft bearing, and sealed impeller housing to physically pump the recycle gas. A controllable electric motor drive 68 powers the impeller via the impeller shaft.

The anode tail gas at the inlet to the pump is at the stack operating temperature range of about 700° C. to 850° C., which can present a challenge with respect to providing bearings and seals suitable for use at these temperatures. Further, the motor must be thermally isolated from these temperatures within the pump. Another consideration is the energy required to pump the recycle gas. The power required to pump the hot (700° C.) anode tail gas is significantly higher than the energy required to pump an anode tail gas stream at lower temperature.

Figure 2:
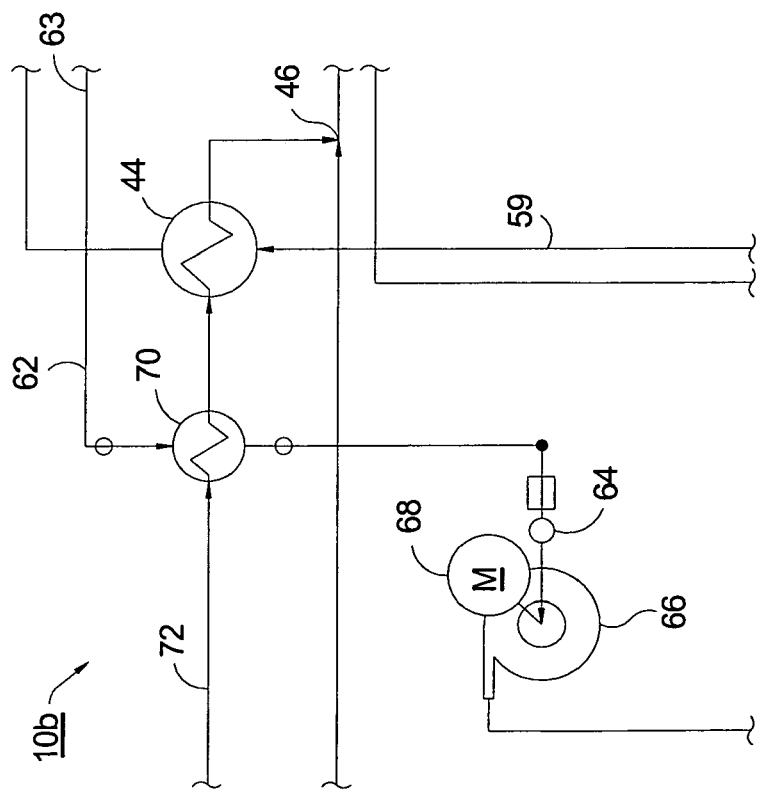
FIG. 2 is a schematic drawing of a second embodiment, taken in circle 2,3,4,5 in FIG. 1.

Referring to FIG. 2, in a second embodiment 10b in accordance with the invention, an anode tail gas cooler in the form of a second heat exchanger 70 is provided in flow leg 63 ahead of primary cathode air heat exchanger 44 in the cathode air flow 72 from valve 42. Anode tail gas portion 62 is passed through one side of exchanger 70, and cathode air 72 is passed through the opposite side. Exchanger 70 reduces the temperature of tail gas 62 to an inlet temperature to pump 66 suitable for conventional technology (bearings, seals, motors). Further, this reduction in temperature improves the efficiency of the impeller within the pump by increasing the density of the pumped tail gas.

The cathode air requirement of the system generally tracks with stack power, as does the flow rate of recycle gas 62. This allows a single passive heat exchanger 70 to effectively cool the recycle gas under all operating conditions. Further, because of the high ratio of cathode air mass flow to recycle gas mass flow under all operating conditions, the recycle gas temperature at the pump inlet is fairly insensitive to changes in cathode air flow volume. Both of these are desirable characteristics of the invention.

Figure 3:
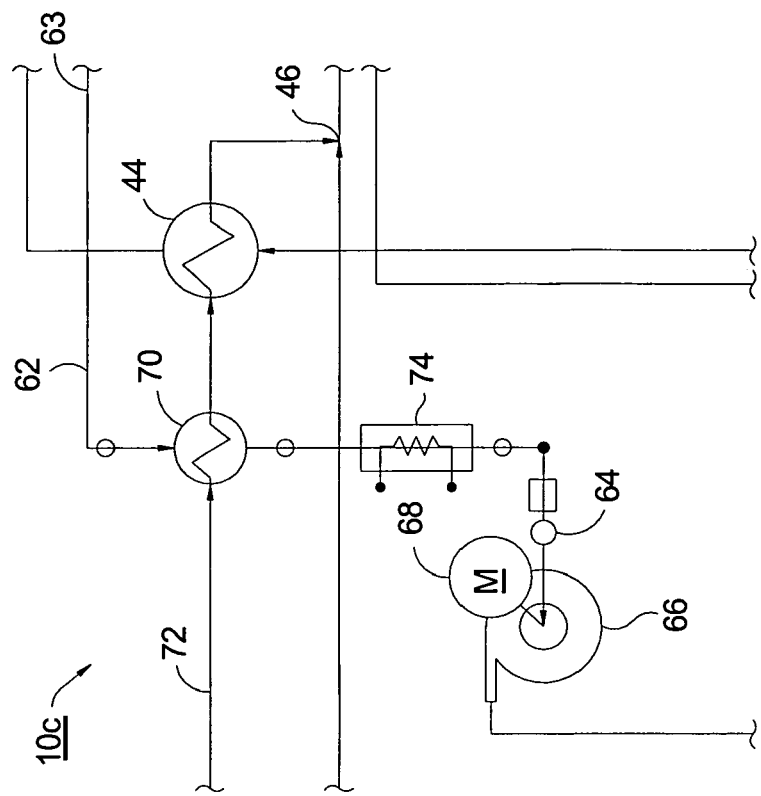
FIG. 3 is a schematic drawing of a third embodiment, taken in circle 2,3,4,5 in FIG. 1.

Under some conditions of off-peak system use, however, recycle gas 62 may be cooled to a temperature below what is required for proper pump operations. In fact, because the recycled anode tail gas contains a high water content, it is possible that under such conditions water will be condensed in heat exchanger 70. Because exchanger 70 is a passive device, no direct temperature control is possible. Referring to FIG. 3, in a third embodiment 10c in accordance with the invention, an optional electric heater 74 having a low wattage capability can be integrated within the heat exchanger 70, or installed in or around the line between heat exchanger 70 and check valve 64 and can be controlled to maintain the drybulb temperature of the anode tail gas above its dewpoint temperature (typically about 75° C.) when entering pump 66, thus preventing sensible water from entering pump 66 and reformer 36. Referring to FIG. 6, heater 74 may be installed within the anode gas flow 62 through counterflow heat exchanger 70.

Figure 4:
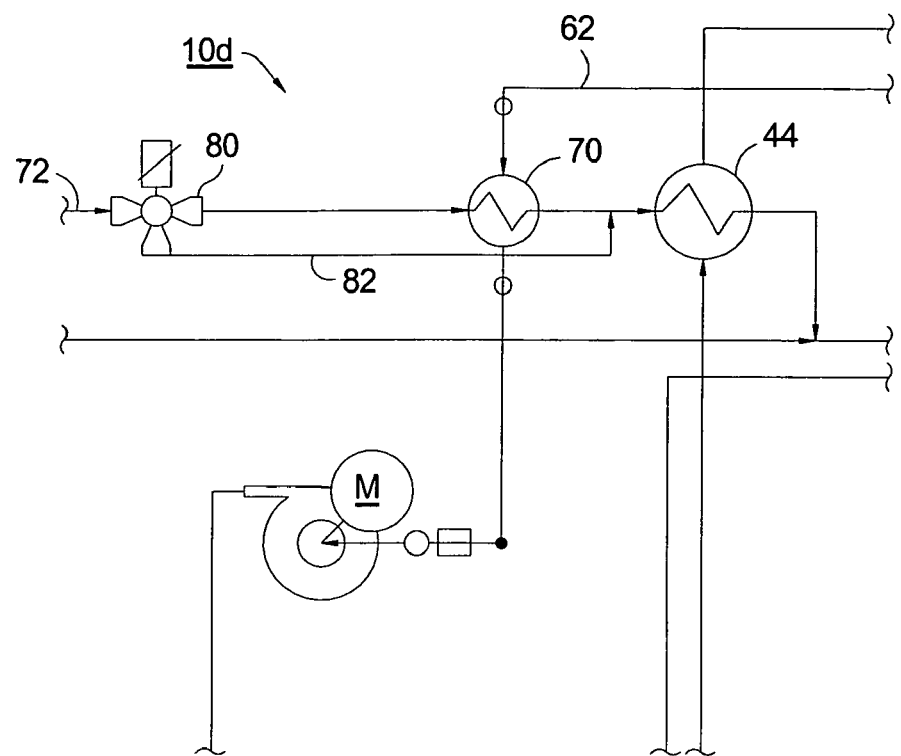
FIG. 4 is a schematic drawing of a fourth embodiment, taken in circle 2,3,4,5 in FIG. 1.

Referring to FIG. 4, a fourth embodiment 10d eliminates the energy penalty of a supplementary electric heater 74. A variable cathode air diverter valve 80 is positioned to controllably divert a portion of cathode air 72 around heat exchanger 70 via a leg 82, thus varying the amount of coolant presented to the heat exchange surface of 70, to prevent over-cooling of the anode tail gas and consequent condensation.

Figure 5:
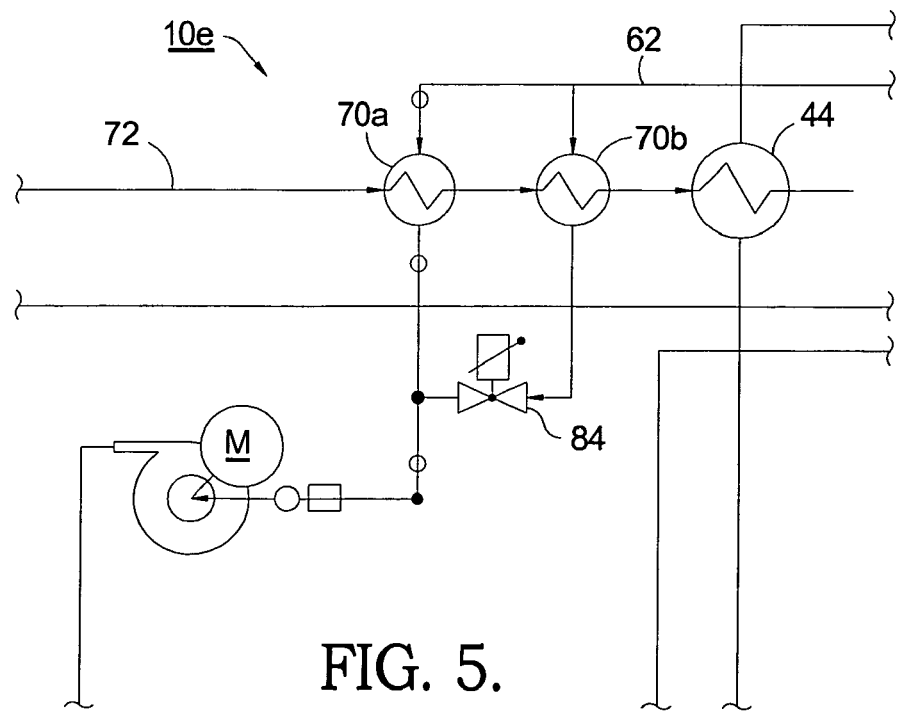
FIG. 5 is a schematic drawing of a fifth embodiment, taken in circle 2,3,4,5 in FIG. 1.

Referring to FIGS. 5 and 7, a fifth embodiment 10e also eliminates the energy penalty of a supplementary electric heater 74. The anode gas heat exchanger 70 is divided into either equal or unequal parts 70a,70b. A control valve 84 is used to shut off one of the parts, either partially or fully, thus reducing the effective size of the heat exchanger under low load conditions to prevent condensation of the anode tail gas. Under peak load, both parts are fully active.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A solid oxide fuel cell stack assembly comprising:
   a) a solid oxide fuel cell stack having anodes and cathodes, said stack producing an anode tail gas;
   b) a reformer for converting hydrocarbon materials into reformate fuel for consumption by said fuel cell stack;
   c) a passage for recycling a portion of said anode tail gas into said reformer, said passage including a controllable pump disposed in said portion between said fuel cell stack and said reformer;
   d) a heat exchanger disposed in said portion upstream of said pump between said fuel cell stack and said reformer, wherein said anode tail gas portion is passed through a first side of said heat exchanger and air is passed through a second side to cool said anode tail gas portion entering said pump, wherein said heat exchanger is configured to control the temperature of said anode tail gas portion exiting said heat exchanger; and
   e) an air diverter valve disposed ahead of said heat exchanger and configured to maintain the temperature of said anode tail gas portion entering said pump above the dewpoint of said anode tail gas portion by varying the amount of air admitted to said heat exchanger.

2. A solid oxide fuel cell stack assembly in accordance with claim 1 further comprising:
   a second heat exchanger in parallel with said heat exchanger for separating said anode tail gas into two parallel flow paths that are recombined downstream of said heat exchanger and said second heat exchanger; and
   a regulating valve for varying tail gas flow through one of said heat exchanger and said second heat exchanger such that the temperature of the recombined flows is above the dewpoint of the anode tail gas.

3. A solid oxide fuel cell stack assembly in accordance with claim 1 further comprising a controllable heater disposed between said heat exchanger and said pump for heating said anode tail gas to a temperature sufficient to prevent condensed water from reaching said pump.

* * * * *